US011822613B2

(12) United States Patent
Catlin et al.

(10) Patent No.: US 11,822,613 B2
(45) Date of Patent: *Nov. 21, 2023

(54) USING VISITOR CONTEXT AND WEB PAGE FEATURES TO SELECT WEB PAGES FOR DISPLAY

(71) Applicant: Zeta Global Corp., New York, NY (US)

(72) Inventors: Timothy J. Catlin, San Mateo, CA (US); Richard E. Chatwin, Sunnyvale, CA (US); Benjamin D. Foster, Campbell, CA (US); Matthew R. McEachen, El Granada, CA (US); Murthy V. Nukala, San Mateo, CA (US); Veeravich T. Thumasathit, Los Altos, CA (US)

(73) Assignee: Zeta Global Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/561,310

(22) Filed: Dec. 23, 2021

(65) Prior Publication Data

US 2022/0114231 A1     Apr. 14, 2022

Related U.S. Application Data

(63) Continuation of application No. 16/917,715, filed on Jun. 30, 2020, now Pat. No. 11,354,376, which is a
(Continued)

(51) Int. Cl.
*G06F 16/957*     (2019.01)
*G06F 3/00*     (2006.01)
(Continued)

(52) U.S. Cl.
CPC ...... *G06F 16/9577* (2019.01); *G06F 16/9535* (2019.01); *G06Q 30/02* (2013.01);
(Continued)

(58) Field of Classification Search
CPC . G06F 16/9577; G06F 16/9535; G06Q 30/02; G06Q 30/0244; G06Q 30/0251; G06Q 30/0277
See application file for complete search history.

(56) References Cited

U.S. PATENT DOCUMENTS

| 6,044,376 A | 3/2000 | Kurtzman, II |
| 6,144,944 A | 11/2000 | Kurtzman, II et al. |

(Continued)

OTHER PUBLICATIONS

"U.S. Appl. No. 12/117,325, Notice of Allowance dated Feb. 16, 2011", 13 pgs.

(Continued)

*Primary Examiner* — Tadesse Hailu
(74) *Attorney, Agent, or Firm* — Schwegman Lundberg & Woessner, P.A.

(57) ABSTRACT

In one embodiment, a method includes accessing a current-visitor context of a current visitor to a web page in a current web-browsing session. The current-visitor context includes one or more data associated with or concerning the current visitor. The method includes selecting based on the current-visitor context a particular one of multiple possible instances of the web page for presentation to the current visitor. The particular one of the multiple possible instances of the web page is substantially most likely to generate a highest expected outcome from interaction with the web page by the current visitor as indicated by the current-visitor context.

20 Claims, 9 Drawing Sheets

Related U.S. Application Data continuation of application No. 16/038,937, filed on Jul. 18, 2018, now Pat. No. 10,698,970, which is a continuation of application No. 14/254,637, filed on Apr. 16, 2014, now Pat. No. 10,049,169, which is a continuation of application No. 13/164,585, filed on Jun. 20, 2011, now abandoned, which is a continuation of application No. 12/117,325, filed on May 8, 2008, now Pat. No. 7,966,564.

(51) Int. Cl.
*G06Q 30/02* (2023.01)
*G06F 16/9535* (2019.01)
*G06Q 30/0242* (2023.01)
*G06Q 30/0251* (2023.01)
*G06Q 30/0241* (2023.01)

(52) U.S. Cl.
CPC ..... *G06Q 30/0244* (2013.01); *G06Q 30/0251* (2013.01); *G06Q 30/0277* (2013.01)

(56) References Cited

U.S. PATENT DOCUMENTS

| | | | |
|---|---|---|---|
| 6,421,733 B1 | 7/2002 | Tso et al. | |
| 6,832,237 B1 | 12/2004 | Christensen et al. | |
| 6,853,982 B2 | 2/2005 | Smith et al. | |
| 7,406,434 B1 | 7/2008 | Chang et al. | |
| 7,523,087 B1 | 4/2009 | Agarwal et al. | |
| 7,627,606 B2 | 12/2009 | Barth | |
| 7,752,308 B2 | 7/2010 | Hutchinson | |
| 7,809,725 B1 | 10/2010 | Vasilik | |
| 7,895,293 B1 | 2/2011 | Vasilik | |
| 7,966,564 B2 | 6/2011 | Catlin et al. | |
| 8,166,155 B1 | 4/2012 | Rachmeler et al. | |
| 8,214,264 B2 | 7/2012 | Kasavin et al. | |
| 8,234,632 B1 | 7/2012 | Hugeback et al. | |
| 8,296,643 B1 | 10/2012 | Vasilik | |
| 8,812,359 B2 * | 8/2014 | Yeh | G06Q 30/0244 707/771 |
| 10,049,169 B2 | 8/2018 | Catlin et al. | |
| 10,698,970 B2 | 6/2020 | Catlin et al. | |
| 2002/0010625 A1 | 1/2002 | Smith et al. | |
| 2004/0044566 A1 * | 3/2004 | Bostelmann | G06Q 30/02 705/14.35 |
| 2004/0044569 A1 | 3/2004 | Roberts et al. | |
| 2004/0054574 A1 | 3/2004 | Kaufman et al. | |
| 2005/0038894 A1 * | 2/2005 | Hsu | G06Q 30/0224 709/228 |
| 2005/0097008 A1 | 5/2005 | Ehring et al. | |
| 2005/0102292 A1 | 5/2005 | Tamayo | |
| 2005/0195960 A1 | 9/2005 | Shaffer et al. | |
| 2006/0080297 A1 | 4/2006 | Barth | |
| 2006/0212350 A1 | 9/2006 | Ellis et al. | |
| 2006/0271671 A1 | 11/2006 | Hansen | |
| 2007/0061421 A1 | 3/2007 | Karidi | |
| 2007/0136255 A1 | 6/2007 | Rizzo et al. | |
| 2007/0168465 A1 | 7/2007 | Toppenberg et al. | |
| 2007/0244748 A1 | 10/2007 | Smith et al. | |
| 2007/0256029 A1 | 11/2007 | Maxwell | |
| 2007/0271352 A1 | 11/2007 | Khopkar et al. | |
| 2007/0271392 A1 | 11/2007 | Khopkar et al. | |
| 2007/0271501 A1 | 11/2007 | Vasilik | |
| 2007/0271511 A1 | 11/2007 | Khopkar et al. | |
| 2008/0004940 A1 | 1/2008 | Rolleston Phillips | |
| 2008/0091526 A1 | 4/2008 | Shoemaker | |
| 2008/0097843 A1 | 4/2008 | Menon et al. | |
| 2008/0128986 A1 | 6/2008 | Morris et al. | |
| 2008/0128991 A1 | 6/2008 | Fisher et al. | |
| 2008/0189156 A1 | 8/2008 | Voda et al. | |
| 2008/0195483 A1 | 8/2008 | Moore | |
| 2008/0198847 A1 | 8/2008 | Yamagishi et al. | |
| 2008/0214152 A1 | 9/2008 | Ramer et al. | |
| 2008/0214156 A1 | 9/2008 | Ramer et al. | |
| 2008/0221987 A1 | 9/2008 | Sundaresan et al. | |
| 2008/0222283 A1 | 9/2008 | Ertugrul et al. | |
| 2008/0275980 A1 | 11/2008 | Hansen | |
| 2008/0288328 A1 | 11/2008 | Minor et al. | |
| 2009/0030859 A1 | 1/2009 | Buchs et al. | |
| 2009/0037253 A1 | 2/2009 | Davidow et al. | |
| 2009/0043608 A1 | 2/2009 | Nadas et al. | |
| 2009/0063268 A1 | 3/2009 | Burgess et al. | |
| 2009/0106096 A1 | 4/2009 | Horowitz | |
| 2009/0132373 A1 | 5/2009 | Redlich | |
| 2009/0150372 A1 | 6/2009 | Batista Reyes et al. | |
| 2009/0198507 A1 | 8/2009 | Rhodus | |
| 2009/0222550 A1 | 9/2009 | McAfee et al. | |
| 2009/0234711 A1 | 9/2009 | Ramer et al. | |
| 2009/0240674 A1 | 9/2009 | Wilde et al. | |
| 2009/0254971 A1 | 10/2009 | Herz et al. | |
| 2009/0299998 A1 | 12/2009 | Kim | |
| 2010/0121861 A1 | 5/2010 | Marsden et al. | |
| 2010/0153999 A1 | 6/2010 | Yates | |
| 2010/0185674 A1 | 7/2010 | Jobs et al. | |
| 2010/0281389 A1 | 11/2010 | Hutchinson | |
| 2010/0299325 A1 | 11/2010 | Tzvi et al. | |
| 2011/0246906 A1 | 10/2011 | Catlin et al. | |
| 2011/0252330 A1 | 10/2011 | Catlin et al. | |
| 2012/0109744 A1 * | 5/2012 | Yeh | G06Q 30/0246 705/14.45 |
| 2012/0116884 A1 * | 5/2012 | Yeh | G06Q 30/02 705/14.58 |
| 2014/0372901 A1 | 12/2014 | Catlin et al. | |
| 2019/0026384 A1 | 1/2019 | Catlin et al. | |
| 2020/0334320 A1 | 10/2020 | Catlin et al. | |

OTHER PUBLICATIONS

"U.S. Appl. No. 12/117,325, Preliminary Amendment filed Jul. 23, 2009", 21 pgs.

"U.S. Appl. No. 12/117,325, Preliminary Amendment filed Oct. 22, 2008", 4 pgs.

"U.S. Appl. No. 13/164,561, Non Final Office Action dated Dec. 3, 2012", 17 pgs.

"U.S. Appl. No. 13/164,585, Advisory Action dated Feb. 1, 2013'", 3 pgs.

"U.S. Appl. No. 13/164,585, Final Office Action dated Nov. 14, 2012", 12 pgs.

"U.S. Appl. No. 13/164,585, Non Final Office Action dated Jun. 14, 2012", 9 pgs.

"U.S. Appl. No. 13/164,585, Non Final Office Action dated Oct. 16, 2013", 12 pgs.

"U.S. Appl. No. 13/164,585, Response filed Jan. 14, 2013 to Final Office Action dated Nov. 14, 2012", 14 pgs.

"U.S. Appl. No. 13/164,585, Response filed Sep. 19, 2012 to Non Final Office Action dated Jun. 14, 2012", 14 pgs.

"U.S. Appl. No. 14/254,637, Advisory Action dated Jun. 16, 2017", 3 pgs.

"U.S. Appl. No. 14/254,637, Final Office Action dated Feb. 21, 2017", 11 pgs.

"U.S. Appl. No. 14/254,637, Final Office Action dated Mar. 8, 2018", 12 pgs.

"U.S. Appl. No. 14/254,637, Non Final Office Action dated Jun. 22, 2016", 11 pgs.

"U.S. Appl. No. 14/254,637, Non Final Office Action dated Sep. 20, 2017", 13 pgs.

"U.S. Appl. No. 14/254,637, Notice of Allowance dated Apr. 11, 2018", 8 pgs.

"U.S. Appl. No. 14/254,637, Response filed Mar. 16, 2018 to Final Office Action dated Mar. 8, 2016", 12 pgs.

"U.S. Appl. No. 14/254,637, Response filed May 19, 2017 to Final Office Action dated Feb. 21, 2017", 10 pgs.

"U.S. Appl. No. 14/254,637, Response filed Nov. 22, 2016 to Non Final Office Action dated Jun. 22, 2016", 13 pgs.

"U.S. Appl. No. 14/254,637, Response filed Dec. 8, 2017 to Non Final Office Action dated Sep. 20, 2017", 14 pgs.

"U.S. Appl. No. 16/038,937, Corrected Notice of Allowability dated Apr. 29, 2020", 2 pgs.

(56) References Cited

OTHER PUBLICATIONS

"U.S. Appl. No. 16/038,937, Non Final Office Action dated Dec. 19, 2019", 5 pgs.
"U.S. Appl. No. 16/038,937, Notice of Allowance dated Feb. 28, 2020", 13 pgs.
"U.S. Appl. No. 16/038,937, Preliminary Amendment Filed Jul. 19, 2018", 4 pgs.
"U.S. Appl. No. 16/038,937, Response filed Feb. 11, 2020 to Non Final Office Action dated Dec. 19, 2019", 2 pgs.
"U.S. Appl. No. 16/038,937, Supplementary Preliminary Amendment filed Oct. 16, 2018", 7 pgs.
"U.S. Appl. No. 16/917,715, Non Final Office Action dated Jun. 15, 2021", 11 pgs.
"U.S. Appl. No. 16/917,715, Notice of Allowance dated Oct. 28, 2021", 7 pgs.
"U.S. Appl. No. 16/917,715, PTO Response to Rule 312 Communication dated Jan. 6, 2022", 2 pgs.
"U.S. Appl. No. 16/917,715, Response filed Oct. 14, 2021 to Non Final Office Action dated Jun. 15, 2021", 8 pgs.

* cited by examiner

USING VISITOR CONTEXT AND WEB PAGE FEATURES TO SELECT WEB PAGES FOR DISPLAY

RELATED APPLICATIONS

This application is a continuation of U.S. patent application Ser. No. 16/917,715 filed on Jun. 30, 2020, which is a continuation of U.S. patent application Ser. No. 16/038,937 filed on Jul. 18, 2018, which is a continuation of U.S. patent application Ser. No. 14/254,637 filed on Apr. 16, 2014, which is a continuation of U.S. patent application Ser. No. 13/164,585 filed on Jun. 20, 2011, which is a continuation of U.S. patent application Ser. No. 12/117,325, now U.S. Pat. No. 7,966,564, filed on May 8, 2008, the disclosure of each of which is incorporated herein by reference.

TECHNICAL FILED

This disclosure generally related to information systems.

BACKGROUND

With the great amount of information available on the Internet, and the increasing competition for visitor attention, serving effective web pages is critically important in many industries, such as online lead generation, brand promotion, and online advertising, where the Internet is used to direct visitors to web sites of vendors or advertisers. Such activities depend heavily on targeting meaningful ads or content to visitors in the expectation of engendering specific visitor interaction with specific web sites. Through hypertext linking and supplemental content serving mechanisms, online advertising systems allow ad messages to be delivered through focused delivery channels that target specific audiences and that are tailored to these different audiences. Visitor interaction with a targeted message, such as an online ad or text message typically results in the direction or redirection of a visitor to a web page (landing page) served by an advertiser or vendor. For example, when a visitor clicks on an advertisement that is displayed on a target web page or clicks on a text link produced as the result of a search engine query, the visitor is directed to a landing page, also referred to as a lead capture page. The landing page displays content that is a logical extension of the advertisement or link, and is optimized to feature specific keywords or phrases for indexing by search engines. This type of lead generation system is one example of an application in which optimized web pages are served to a visitor, and many other applications are possible.

Typical landing pages either present information that is relevant to the visitor, such as text/image content, links, or similar elements, or they provide the visitor with an opportunity to complete a transaction, such as by clicking on a link to make a purchase, filling out a form, redeeming a coupon, or performing some other action with the goal being the immediate or eventual sale of a product or service. The event of a visitor taking a desired action on a landing page is referred to as a conversion. The efficiency or the quality of the web page can be measured by its conversion rate, which is the percentage of visitors who completed the desired action. The efficiency and effectiveness of an online marketing program is thus determined by the conversion rate of the web pages used in the program. Web pages are thus constantly evaluated and possibly replaced or modified during the course of an ad campaign.

This test and modification process hopefully yields a web page or pages that are optimized for the campaign. In this context, the term "optimized" refers to the result of a process of designing web pages based on an estimated efficiency with respect to a particular objective. Web pages can be optimized along many different dimensions, depending upon their purpose and the context in which they are accessed. Web pages are typically optimized with respect to their creative content and appearance, so that a visitor will be persuaded to purchase a product or service through the web page based on the content and look and feel of the page. It is generally very difficult to optimize web pages for all topics or products that a website may provide and for all visitors to the website. In some cases (e.g., for a specific audience) a particular page may be more efficient than another page, and in other cases it may be less efficient. In order to maximize efficiency and to prevent burnout caused by overexposure of efficient web pages, page sponsors will generate multiple web pages, each differing in some respect from the others, and then rotate them in and out of service. Various different testing schemes can be employed to test the effectiveness of different web pages, such as A/B testing and multivariate testing (MVT). Dramatic differences in visitor interaction can be often be seen through testing different copy text, form layouts, images, background colors and other features on a landing page.

In the online advertising context, testing involves comparing two or more content variations of one or more components of a website in a live environment. The test procedure typically performs numerous split tests or A/B tests on a web page at the same time to determine the best of two or more web pages, or conducts multivariate testing to determine the best combination of content variations across multiple web page components. In multivariate testing, the practical limit on the number of combinations and the number of variables in a test are the amount of time it will take to get a statistically valid sample of visitors, given the rate of visitors to the site per unit time and the average conversion rate across the tested alternatives. In general, multivariate testing is carried out on a dynamically generated website by setting up the server to display the different variations of content in equal proportions to incoming visitors. Visitor behavior after exposure to the different variations is measured, analyzed and presented as statistical data. The web page can then be modified in response to the statistical data and a new or modified web page can be redeployed and then tested. Multivariate testing is thus a relatively static testing scheme that is not particularly flexible or conducive to real-time authoring or modification of web pages.

One disadvantage associated with present web page testing methods is that they assume that there is only one optimal web page or that some features or characteristics are inherently better or more important than other features. That is, the multivariate testing protocols are set up under the assumption that only one web page will be the best (i.e., most efficient) page for all conditions. In reality, however, the model of a single "best" web page is severely limiting because different web pages may be better than others depending upon a number of significant factors, such as where and how the visitor accessed the page (visitor context), the purpose of the web page, and many other possible factors. Furthermore, the test-modification-retest cycle of present testing methods to find a single optimum web page often results in a test and deployment cycle that is too long in the context of ad campaigns that typically require fast deployment of web pages.

Particular embodiments of a web page server optimization system are described. Continuous full-path optimization from initial visitor interaction with the web page is provided. The web page server optimization system includes a visitor context analysis component that analyzes certain parameters related to how the visitor has accessed the web page. A real-time web page optimizer component introduces variations in one or more features of a web page to create a new web page, conducts structured tests of the new web page, compares the performance of the web page with one or more known served web pages and removes from presentation eligibility those pages with inferior performance. This system facilitates real-time decision making of which web page of a variety of different possible web pages to serve to a visitor based on an accumulated visitor context, it further allows the authoring of web pages that are optimized with respect to eliciting a desired user interaction with the web page.

Such an optimization system can be used in any type of information retrieval application, such as a document, web page, or online advertisement serving process, based on an information request, such as a query executed through an Internet search engine. For example, when a search is performed using an online search engine (e.g., Google® or Yahoo®), a content provider may serve a search result page to the visitor in response to the query. If the visitor clicks on a response link, or similarly, if the visitor clicks on an online ad or message, an ad server or supplemental content provider may direct the visitor to a web page that seeks to persuade the visitor to make a purchase or interact further with the served website. The system can also be used to optimize banner ads or any other component in a system that provides the visitor with an original impression and then re-directs the visitor to subsequent websites. Thus, particular embodiments may be directed to any type of keyword-based information retrieval system or linked supplemental message serving system in which content from one server is accessed through another server, or where such supplemental content is embedded into content from a different server computer.

DESCRIPTION OF EXAMPLE EMBODIMENTS

For purposes of the following description, the web page that is served to the visitor may be a landing page that is accessed through one or more intermediate websites, or it may be a web page that is accessed directly on a target website by the visitor. Unless otherwise stated, it should be understood that the term "web page" or "landing page" may represent an entire web page, or a portion of a web page displayed on the visitor client computer. Likewise, it may represent a component of a page, such as a banner ad. In a general meaning, a web page or landing page served by processes of a web page optimization method may be any type of directed content that is served directly or indirectly from a server computer to the visitor client computer over a network.

Figure 1:
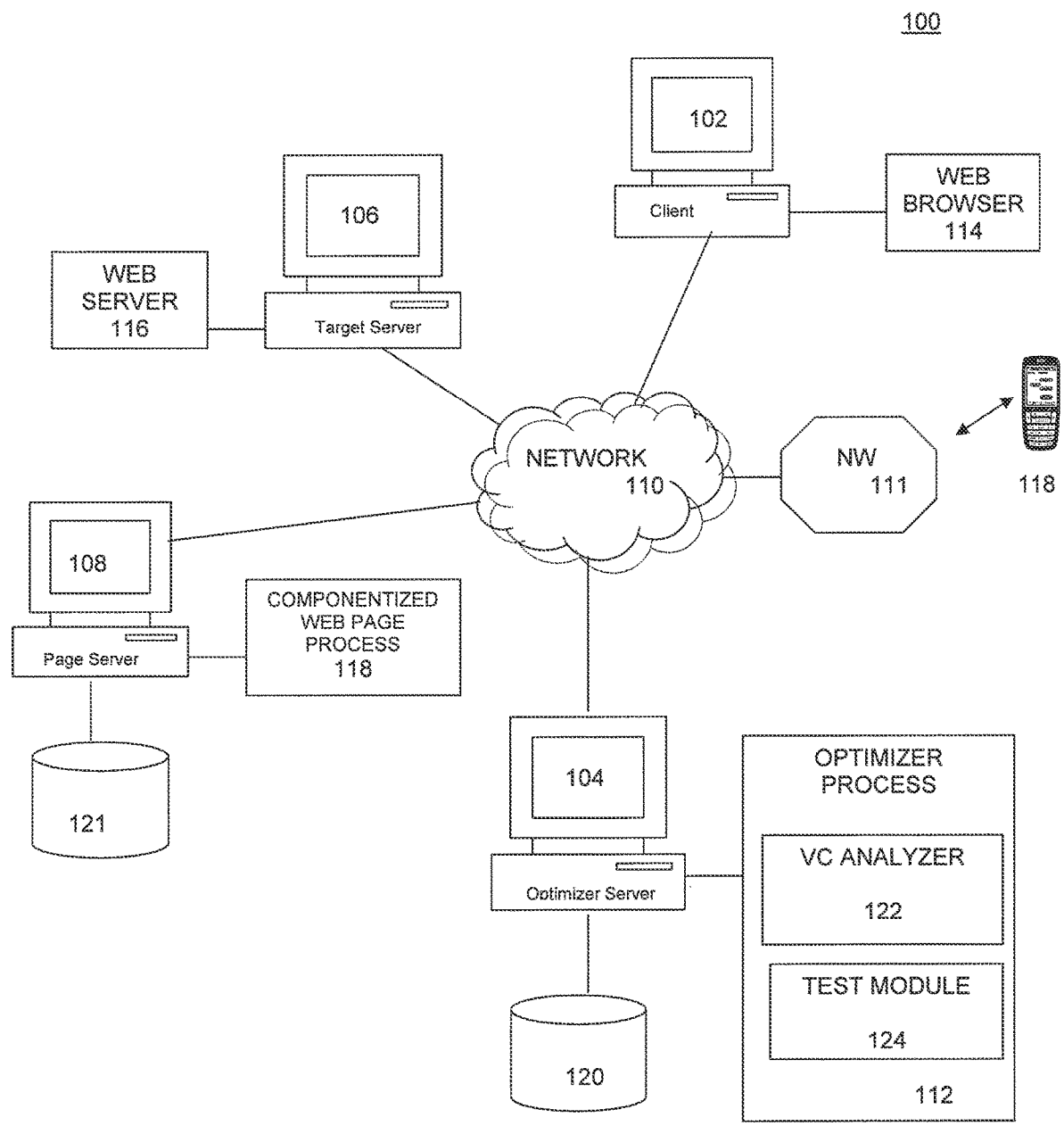
FIG. 1 is a block diagram of a network-based web page optimization system in an example embodiment.

Aspects of the one or more particular embodiments described herein may be implemented on one or more computers or computing devices executing software instructions. The computers may be networked in a client-server arrangement or similar distributed computer network. FIG. 1 illustrates a computer network system 100 that implements one or more particular embodiments of a landing page optimization process. In system 100, network server computers 104 and 106 are coupled, directly or indirectly to one or more network client computers 102 through a network 110. The network interface between the server computers and client computers may include one or more routers (not shown) that serve to buffer and route the data transmitted between the computers. Network 110 may be the Internet, a Wide Area Network (WAN), a Local Area Network (LAN), or any combination thereof. The client computer can be any class of computing device, such as personal computer, workstation, laptop/notebook computer, personal computing device (PDA), or mobile communication or computing device, such as smartphone 118. The client computers could be coupled to network 110 directly or through intermediate networks, such as cell network 111.

In one example embodiment, a visitor using client computer 102 accesses one or more server computers, such as target server computer 106, which is a World-Wide Web (WWW) server that stores data in the form of web pages and transmits these pages as Hypertext Markup Language (HTML) files over the Internet 110 to the client computer 102, using a web server process 116. For this embodiment, the client computer 102 typically runs a web browser program 114 to access the web pages served by server computer 106 and any other available content provider or supplemental server, such as server 108. In a typical web browsing session, target server 106 can be a search engine server (e.g., Google), publisher or portal site (e.g., Yahoo, MSN), vendor site (e.g., Amazon, Ebay), company site or any other target web site. The target website served by server 106 typically contains its own content as well as hyper links to other sites or content directly served into the target web page from separate server computers. One such separate server computer is web page server 108. In one example embodiment, web page server computer 108 represents a landing page or ad server computer that serves advertisement messages or supplemental messages (collectively referred to as "ads" or "advertisements") to the client computer 102 through the target website served by server 106. Server computer 108 can also serve landing pages that may be accessed through links or actions taken on the target server 106 by the visitor, such as in the case of a search engine query or hyperlink selection on the target website. The landing page server 108 may have access to a variety of different landing pages or ads that can be served to the visitor based on various different factors. Such content may be stored in a data store 121 closely coupled to server 108 or in a remote data store or other server resource. Data for such landing pages or ad messages could comprise any type of digital data, such as text, audio, graphic or video data. For this case, the server computer 108 executes a componentized web page process 118 that can build a web page that includes several objects or components. The components are selected or assembled in a manner that provides the most desirable or effective web page that is ultimately displayed to the visitor through client computer 102.

For the example embodiment illustrated in FIG. 1, the web page or ad served by server 108 is optimized based on defined criteria and processes executed by an optimizer server 104. Optimizer server 104 in network system 100 is a server computer that executes an optimizer process 112. Client versions of this process or client modules for this server process may also be executed on the client computer 102. This optimizer process 112 may represent one or more executable programs modules that are stored within network server 104 and executed locally within the server. Alternatively, however, it may be stored on a remote storage or processing device coupled to server 104 or network 110 and accessed by server 104 to be locally executed. In another example embodiment, the optimizer process 112 may be implemented in a plurality of different program modules, each of which may be executed by two or more distributed server computers coupled to each other, or to network 110 separately.

As shown in FIG. 1, the optimizer process 112 executed by server 104 includes a number of separate programming modules (or components) that serve to evaluate factors related to the visitor's access of the web page served by page server 108, analyze the web pages or ads that can possibly be served to the visitor, and then optimize the landing pages served to the visitor based on these, and other factors. In one example embodiment, the optimizer process 112 includes a visitor context analyzer component 122 that analyzes the various factors (contexts) dictating how the visitor has accessed or been directed to the landing page through the target website, and a testing module 124 that analyzes the different landing pages available, compares their effectiveness against one another and causes the most effective page or pages to be served by server 108. The testing component 124 selects the most efficient web page based on the visitor context results returned by the visitor context analyzer component 122. The optimizer process 112 may also provide authoring or modification tools to define landing page content. This function may work in conjunction with any componentized web page process 118 executed on the web server 108.

Figure 2:
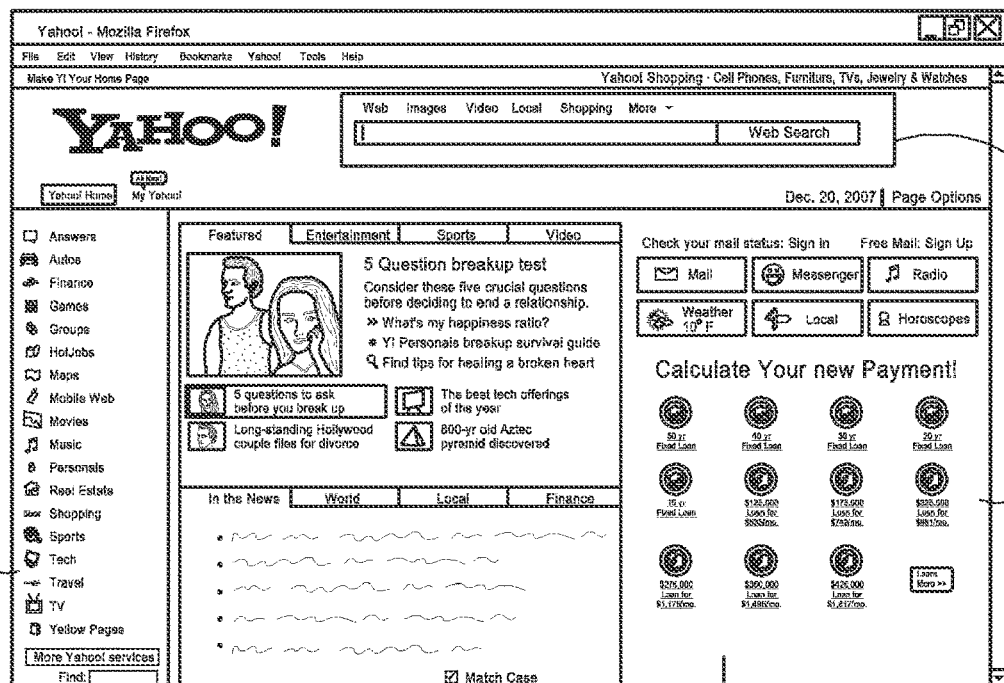
FIG. 2 illustrates the access and optimization of a web page through a target website in an example embodiment.

Example embodiments illustrated and discussed below will be presented in the context of a web page (landing page) served by server 108 to the client visitor 102 through target server 106, however, it should be noted that such embodiments can also be directed to other supplemental content, such as banner ads, and the like, and to direct access by the client without a target server. FIG. 2 illustrates the access and optimization of a web page through a target website in an example embodiment. For the example embodiment of FIG. 2, target website 202 represents a web page served by target server 106. This web page includes text/graphical content, as well as a number of different fields, such as a search field 201 and hyperlink buttons for accessing other pages within the target site or on other sites on the Web. Web page 202 also includes an online ad message 203. This ad contains a link to an ad server 108 that directs the visitor to a landing page 206 when the visitor clicks on an appropriate area of the ad 203. Many different landing pages may be served by the landing page server 108 in response to the ad message 203, and some may be more effective than others in persuading the visitor to take a particular action. In one example embodiment, the web page 206 served in response to the visitor action is optimized 204 by a optimizer process 112 executed on server 104. In general, optimization may be performed along any number of dimensions. In one example embodiment, the landing page is optimized in response to certain visitor context data as well as features of the landing page itself. As can be seen in the example of FIG. 2, landing page 206 contains a number of different editable elements, and each discrete element can be referred to as a feature of the landing page.

Figure 3:
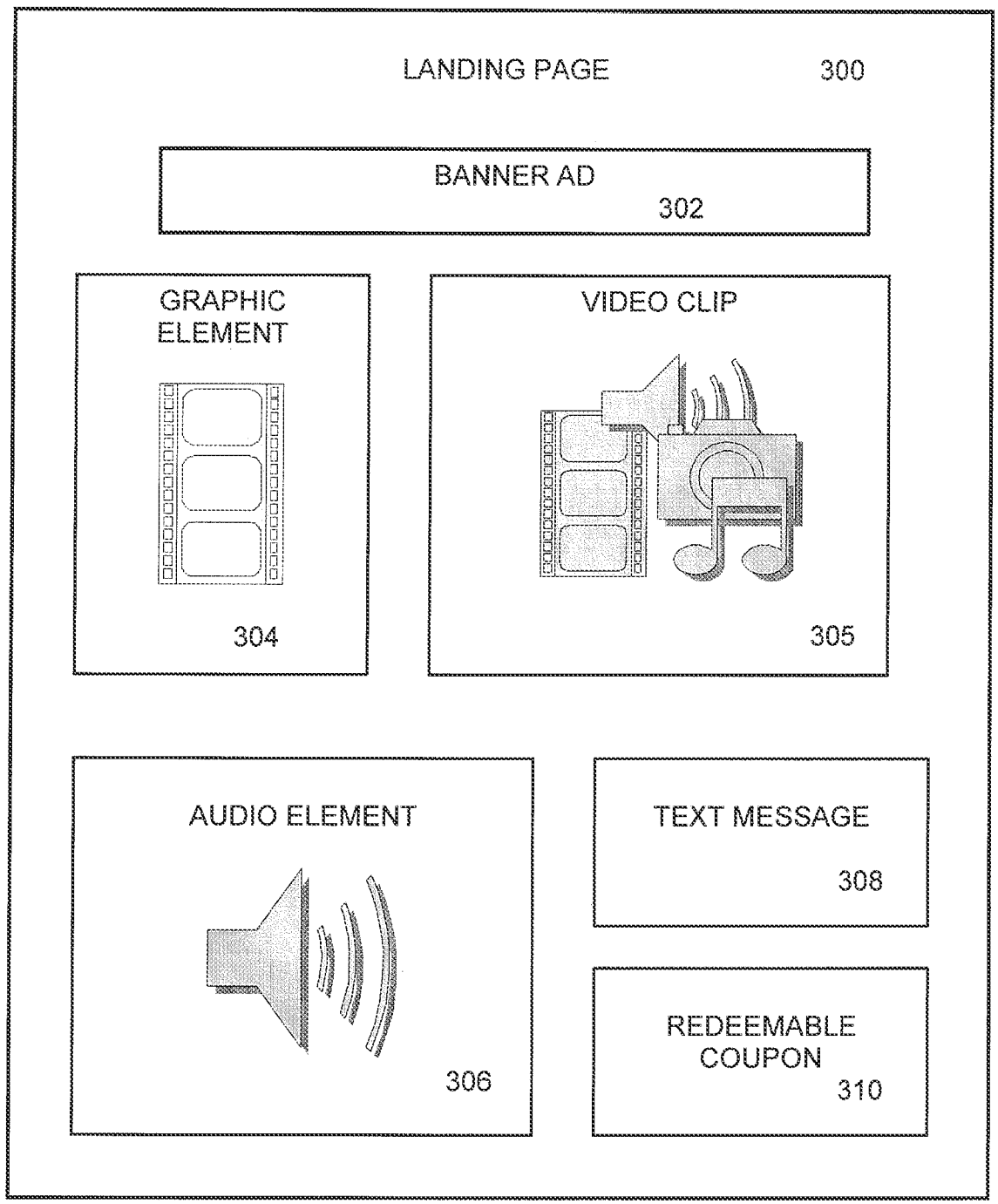
FIG. 3 illustrates representative features of an example web page in a particular embodiment.

FIG. 3 illustrates representative features of an example landing page or any served web page in an example embodiment. A web page can have any number of different features depending upon its creative content and its look and feel (i.e., appearance/layout). It can include graphic elements (pictures) 304, audio elements (e.g., sound effects, music) 306, video clips 305, text messages 308, and command buttons or action item selections, such as redeemable coupons 310 or any other mechanisms that allow a visitor to make a purchase or interact with vendor or target site through the landing page. When the visitor performs an action encouraged or provided by the web page, a conversion has occurred. The various different features of the web page can all have an effect on whether such a conversion will occur for a particular visitor. Because web pages are audio/visual presentations, a large number of different characteristics of the web page can be defined as features. The color, size, number of elements, type of audio, text font, and any other look and feel type characteristics can be features. Similarly, characteristics associated with each element within the web page can be features, such as the actual content of a picture 304 (such as the presence or absence of people, the nature of the depicted scene, etc.) the genre and volume of any background music 305, the size and shape of any command or selection buttons 310, and so on. Because the features of a web page can have a significant impact on a visitor's experience they can directly determine whether the visitor interacts with the page in the desired manner. Thus, it is important for advertisers or venders to determine the effectiveness of their web page or pages in order to determine the optimum pages to rotate in any given campaign. For example, if an advertiser is offering an online graduate degree program, changing the emphasis or content of one or more features may directly affect a visitor's response based on context factors such as if the visitor accessed the landing page through a web search (e.g., entering queries such as "online education," "master's degree," or "graduate schools") or clicked on an online ad.

Each feature or group of features of FIG. 3 may be referred to as a component of the served web page. Different variations of features produce different web pages. In one example embodiment, a componentized web page process 118 executed by page server 108 is used to create different web pages for serving by server 108, or to select one or more web pages from a body of available web pages stored in data store 121. One function of the componentized web page process 118 is to convert one or more features from a static definition (e.g., color, font, etc.) or object (e.g., picture, video clip, audio clip, etc.) into an editable component. This allows different instantiations of each feature to be defined and modified at the time of the page request by the visitor web browser.

In one example embodiment, many different web pages, each containing one or more variations in one or more features, are stored in a data store 121 for serving by the landing page server 108. The different web pages may be pre-defined with the different features included in each stored landing page. Alternatively, a real-time authoring tool may be provided to enable modification of one or more features at the time the web page is requested by the landing page server 108. Such an authoring tool may be provided as part of optimizer process 112 or it may be provided by a separate process, such as the componentized web page process 118.

Web Page Server Process

In one example embodiment, the web page server process 112 includes several program components that provide the functions related to analyzing certain factors regarding the visitor context of the visitor's access to a web page, analyzing features of the web page, providing authoring tools to allow modification of the web page or selection processes to allow the web page server to select an optimized web page to serve to the visitor in response to visitor action on a target website. In one example embodiment, the optimized web page means the web page estimated to be most likely to elicit a desired visitor interaction with or action on the web page, such that the visitor action can be considered a conversion, or similar successful act. In another example embodiment, the optimized web page means the web page estimated to generate the highest visitor outcome, where visitor outcome can be considered one of immediate revenue associated with a visitor action on the web page, future revenue associated with a visitor action on the web page (either of which is the "revenue rate"), or the value of other successful outcomes (the "value rate"). The optimized, or most effective, web page includes a number of features, at least one or more of which are modifiable in response to analysis of visitor context and pre-defined landing page features. The optimized landing page is the page that exceeds a defined or predicted effectiveness of one or more other web pages based on a defined scale, and for a particular instance consisting of visitor context and one or more other factors.

In general, the optimizer process 112 utilizes an accumulated body of visitor data regarding interaction with one or more web pages to determine an optimized web page to display to a visitor. Various types of session data, including network traffic data for the client computer, demographic information about the visitor, and statistics summarizing general and specific session data of other visitors in similar browsing sessions are defined and compiled. The accumulated session data is utilized to estimate the parameters of a predictive model, which can then be used to predict the effectiveness of a served web page to a specific visitor. A test process tests a number of web pages against one another to select an optimized web page from among the web pages based on the accumulated session data. The optimized web page thus represents a page that is predicted to have a greater likelihood of achieving a desired response from the visitor due to the combination of features of the web page.

Figure 4:
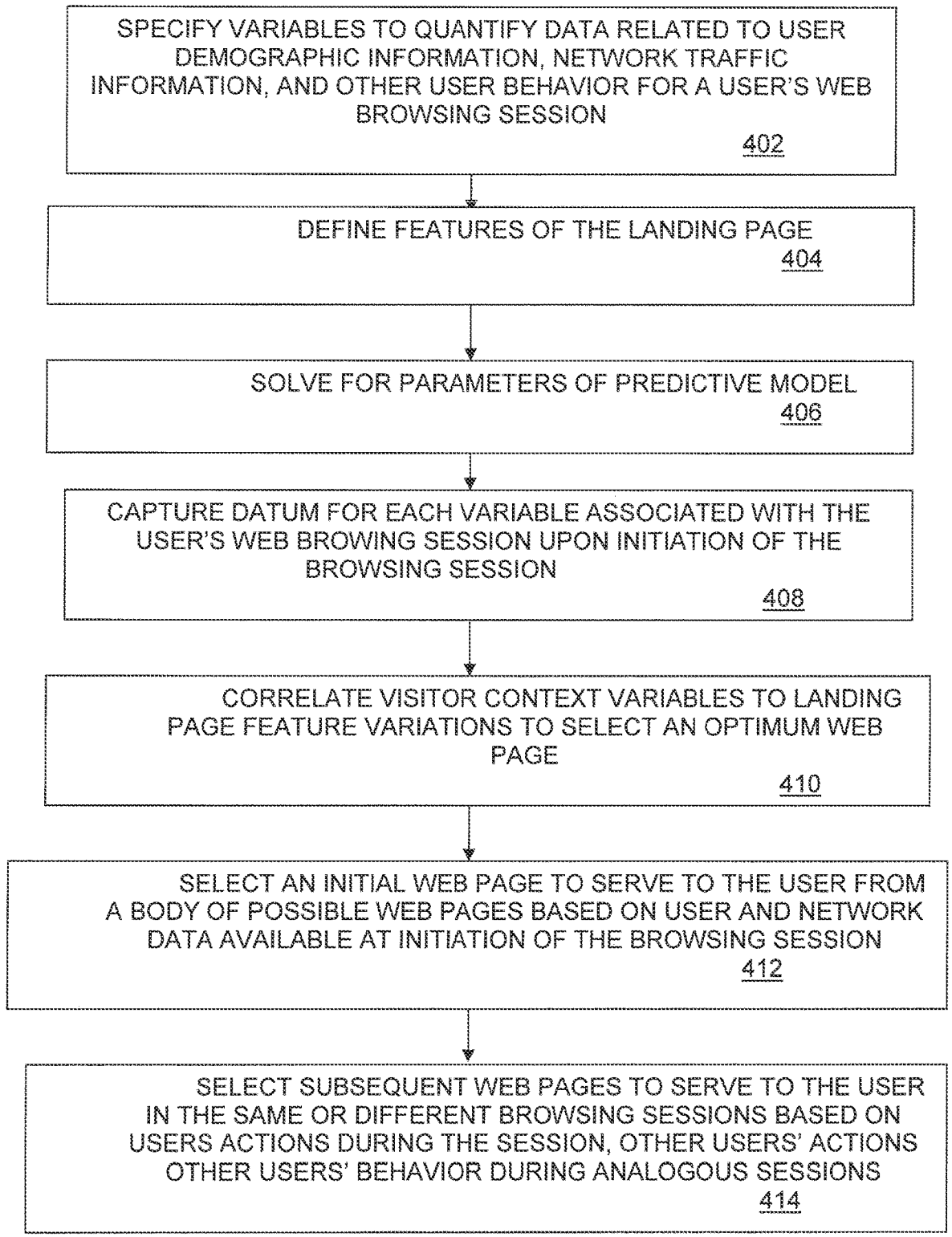
FIG. 4 is a flowchart that illustrates a general method of optimizing a served web page in an example embodiment.

FIG. 4 is a flowchart that illustrates a general method of optimizing a landing page in a landing page server process in an example embodiment. In block 402, the system specifies the variables related to various elements of session data for a web browsing session in which a visitor accesses a web page. The session data can include demographic characteristics of the visitor, such as age, gender, ethnicity; and objective facts regarding the network access, such as the IP or network ID for the client computer, client device type, client location, and time and date of access. The session data can also include certain behavioral trends or acts of the visitor during the web browsing session, such as how the web site was navigated to, frequency of visits to the web page, cursor or keystroke activity during the browsing session, duration of the browsing session, and so on. The session data also includes characteristics of other visitors in analogous browsing sessions. An analogous browsing session is a session in which another visitor accessed the same web page as the visitor, or a web page similar enough to the web page so as to be considered substantially similar, or the same visitor has accessed the same or substantially similar web page at a different time. The other visitor characteristics include network traffic data and any behavioral trends or acts of these visitors during their respective analogous sessions, as well as any other general and specific session data of each visitor that may be disclosed or otherwise made available by such visitors, either directly or indirectly. At any point during the visitor's browsing session, the set of values of the variables associated with the visitor's browsing session to that point defines the "visitor context" of the session.

In block 404, the system defines a set of web page features. Such features could include the features illustrated in FIG. 3. The system then builds a predictive model, block 406. The predictive model includes parameters related to the visitor context variables, the web page features, and combinations thereof. The parameter values are estimated on the basis of accumulated session and response data for previous visitors. In one example embodiment, the desired outcome of a visitor session might be that the visitor purchased a product. In this embodiment the predictive model is a logistic regression model for which the possible responses are that the visitor did or did not purchase a product during the course of the session. The parameters of the logistic regression model include as main effects the visitor context variables and the web page features, together with two-way interaction terms between each visitor context variable and each web page feature, as defined in block 404. The training data set is the accumulated session and response data for the prior visitors and the estimated parameter values are those that maximize the likelihood of the training data. In another example embodiment the parameter values are chosen so as to minimize the sum of the negative log-likelihood of the training data and a regularization or penalty term. The regularization term is typically the sum of the L1 or L2 norms of the parameter values. Alternatively, an L$\lambda$ norm, for any value of $\lambda$ between 1 and 2 could also be used. The relative weights of the negative log-likelihood term and the regularization term can be chosen using one of several techniques that will be familiar to those skilled in the art, such as cross-validation and minimizing the AIC (Akaike Information Criterion).

In other example embodiments, the predictive model includes an ensemble of models. In an example embodiment in which the desired outcome of a visitor session is that the visitor takes a desired action, such as purchasing a product or submitting a completed form, the ensemble of models contains two models. The first of these is a (regularized) logistic regression model, and the second is one which simply estimates the expected response to a given web page in a given visitor context as the observed count of positive visitor responses to the given web page when the visitor has the given visitor context divided by the observed count of all visitor responses to the given web page when the visitor has the given visitor context (possibly smoothed using the Add2 or Add4 methods familiar to those skilled in the art).

In one example embodiment the two models in the ensemble are combined as described in the following. For a given web page and a given visitor context, the mean and variance of the expected visitor response as estimated by the (regularized) logistic regression model are used to define a beta distribution through moment matching. This beta distribution is used as the prior beta distribution in a two-level hierarchical Bayes model for which the second or observation level models the observed count of positive visitor responses to the given web page when the visitor has the given visitor context as a draw from a Binomial distribution with the number of observations equal to the observed count of all visitor responses to the given web page when the visitor has the given visitor context and probability parameter drawn from the prior beta distribution. The variance parameter of the prior beta distribution may be adjusted globally across all visitor context and web page feature combinations through cross-validation or AIC minimization.

As shown in block 408 of FIG. 4, the system captures datum for each variable associated with the visitor's browsing session upon initiation of the session and continues through the visitor taking a desired action with respect to the web page, quitting the session, or navigating away from the web page without doing anything. The system thereby maintains the visitor context for a visitor throughout his or her browsing session.

In block 410, the visitor context is correlated to a combination of feature. variations for an optimized web page. This optimized web page represents the web page with the highest value visitor response, as predicted by the predictive model, from among the body of possible web pages, given the profile of the visitor, the network traffic patterns of the visitor, and the inferred behavior of the other visitors. In block 412, an initial web page to serve to the visitor is selected from a body of possible web pages. The initial web page is selected based upon visitor specific data that is available upon the visitor's initial access of the web page. Such information may be relatively limited, and typically comprises objective traffic data, such as client computer type, IP address (or other network identifier), time of day, and similar items of information. The initially served web page mayor may not be an optimized web page with regard to its effectiveness in achieving a desired response from the visitor. In block 414, the system selects a subsequent web page to serve to the visitor from the body of possible web pages. The selection of the subsequent web page is based on a number of factors, such as data accumulated through the visitor's experience from and after the initiation of the browsing session, data accumulated from other visitors' browsing experiences, and data inferred from what visitors with similar characteristics to the visitor have done in analogous browsing sessions.

Figure 5:
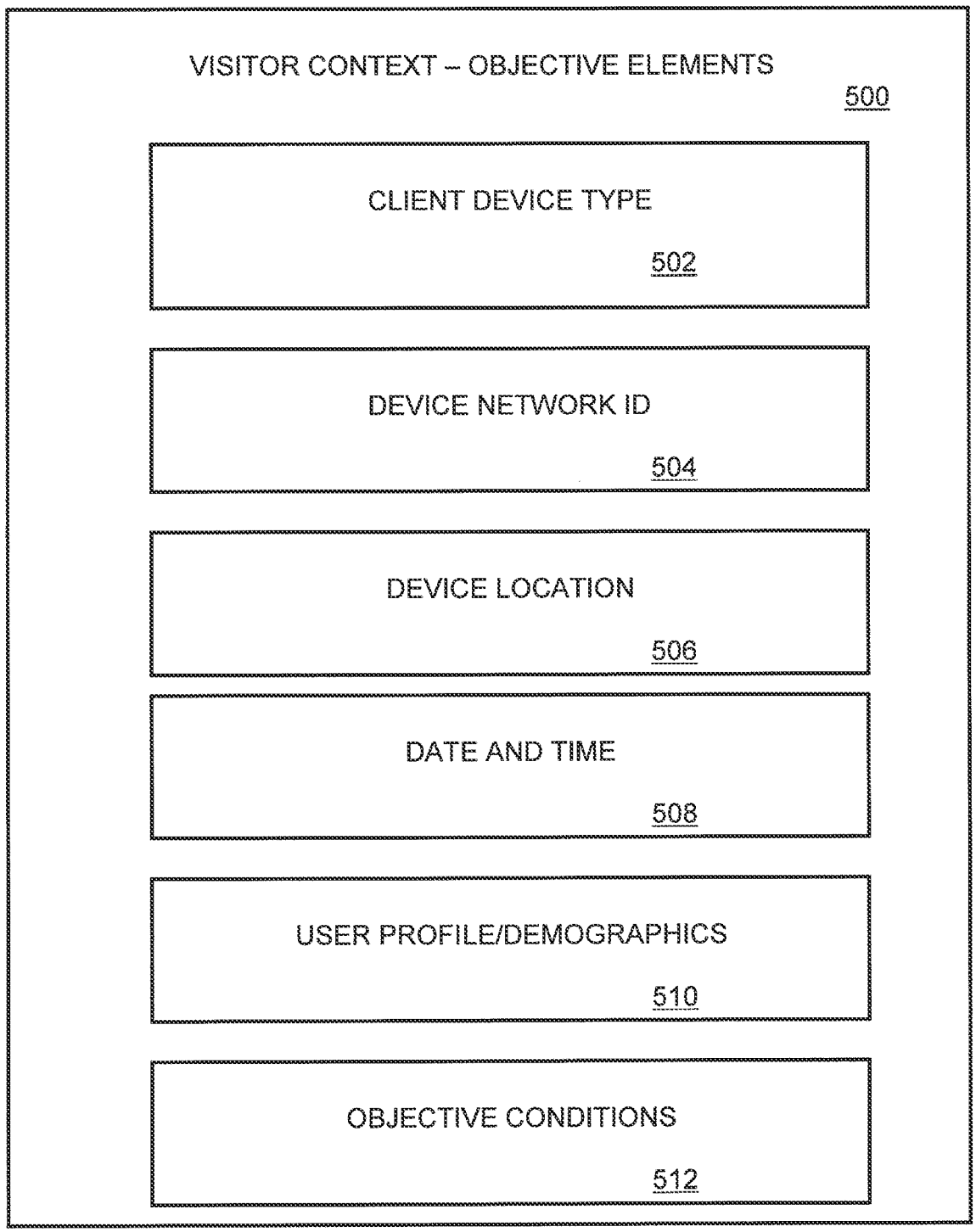
FIG. 5 is a block diagram illustrating components of objective elements of visitor context in a web page server process in a an example embodiment.

As illustrated in FIG. 5, certain items of data regarding different visitors' profiles, network activity and present and historic actions with regard to the web site in a present or analogous browsing session are used to define a visitor context for the browsing session. In general, the visitor context can be divided into objective data for the visitor and network traffic, and behavioral data regarding visitor actions and network traffic.

FIG. 5 is a block diagram illustrating components of objective elements 500 of visitor context in a web page server process in an example embodiment. The objective elements comprise basic information that is available regarding the network access between the client computer and the web page server. This includes the client device type (e.g., workstation computer, PDA, cell phone, etc.) 502, and the network identifier (e.g., IP address, MAC address, etc.) 504 for the device. The objective data also includes the location 506 of the visitor and client device during the browsing session. In some cases the location can be derived from the network address, however, it may also be provided by location-based service (LBS) software, or location determination circuitry (e.g., GPS modules) in the device, if available. The date, time, and day of the week 508 of the network access for the browsing session is also an objective datum that is available, and is typically easily obtained from the network interface components, such as the Internet Service Provider (ISP) router circuitry. In certain cases, visitor profile or demographic data 510 may be available, such as a visitor's age, gender, occupation, ethnicity, preferences, and so on. These may be available through profile data stored on the client computer, or from external database, or through direct input by the visitor in response to questionnaires or similar queries. Other objective conditions 512 may also be defined, and can include environmental conditions related to the visitor, client computer or web browsing session, such as weather, emergency conditions, and the like. Such information may be provided through external databases, or information that is available through the ISP or other intermediate servers.

Figure 6:
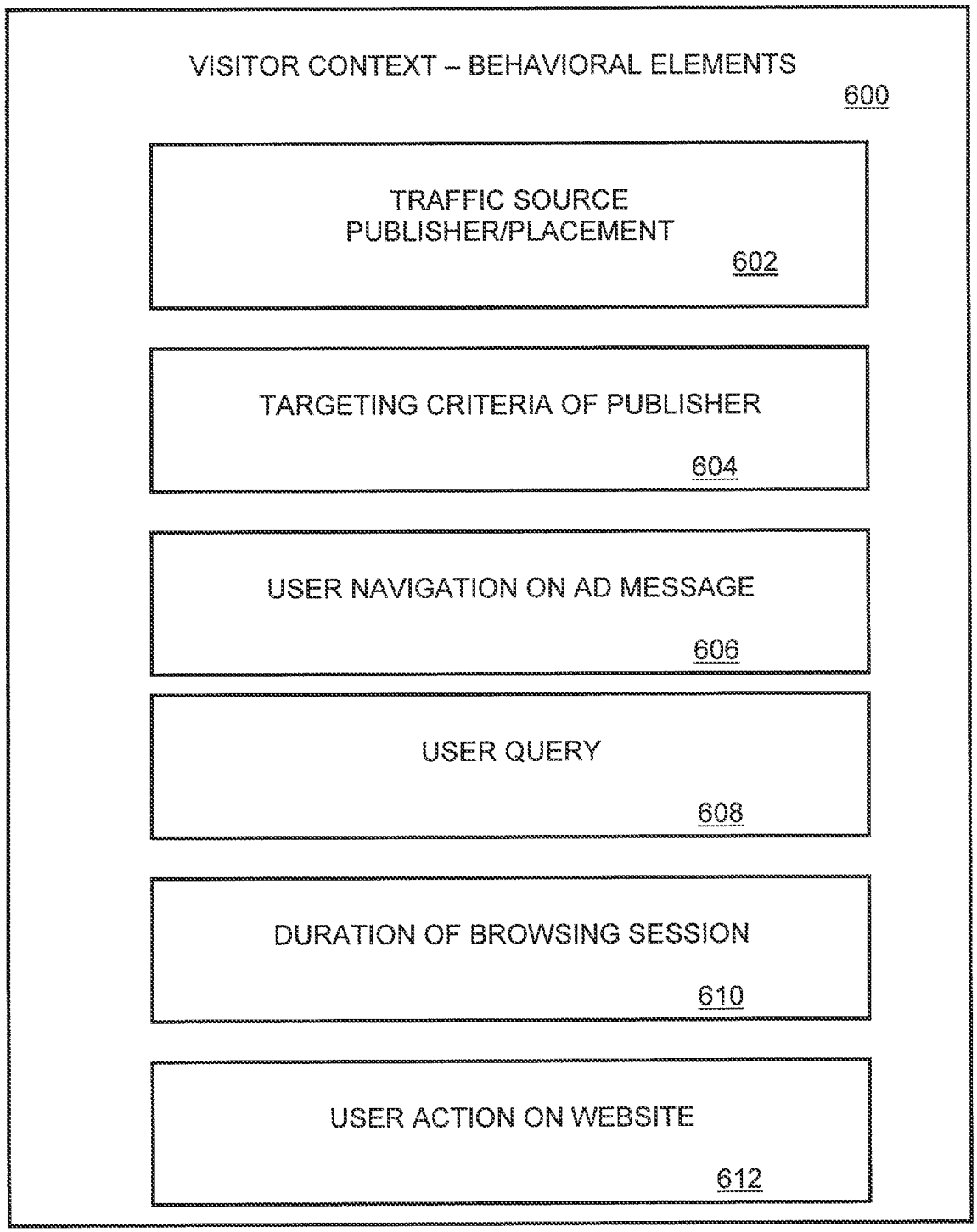
FIG. 6 is a block diagram illustrating components of behavioral elements of visitor context in a web page server process in an example embodiment.

FIG. 6 is a block diagram illustrating components of behavioral elements 600 of visitor context in a web page server process in an example embodiment. These elements largely relate to the navigation of the visitor to the web page and actions taken by the visitor on the web page, if any. These elements include the traffic source that the visitor came from to access the web page. In some cases, the web page is accessed directly by the visitor entering the URL (uniform resource locator) of the page directly into a web portal, such as an ISP home page or search engine URL command line. In other cases, the web page is accessed indirectly through a target website, such as a query in a search engine or access through an ad or message in the target website. Block 602 of FIG. 6 represents the traffic source of the visitor of the web page, and can either be a publisher, which is the type of target website itself (e.g., search engine, web portal, company site, etc.), or a placement (e.g., message, ad, hyperlink, etc.) within a target web page. For example, FIG. 2 illustrates the access to landing page 206 through a placement (ad message) 203 on target web site 202.

Placements within target web sites are often provided by ad or message providers other than the target web site administrator. In this case, there are certain targeting criteria 604 used by the publisher to target visitors within the audience. Ads may be targeted and distributed based on broad criteria, such as globally, nationally, regionally, for certain time durations, and so on; or they may be targeted based on specific criteria, such as visitor selections (clicks), and so on. Other behavioral elements include visitor navigation through an ad message 606, such as through a hierarchy of navigational menus, or specific visitor queries 608 in the target web site. Certain passive acts may also comprise elements of the visitor context. The duration of a browsing session 610 may indicate interest or non-interest of a visitor, since most web pages are primarily content providing rather than interactive. In this case, a short session may imply noninterest, whereas a longer session may indicate valid interest by the visitor in the web page. For interactive web pages, specific visitor action 612 (e.g., clicking on commands, making purchases, etc.) on the web page is often an important factor of visitor context. Depending on implementation details, the visitor context blocks illustrated in FIGS. 5 and 6 may include different or additional components. These elements each inform the decision used to select optimized web pages to display to the visitor. Each element is treated as a variable in the optimizer process 112 of FIG. 1. Some of the elements are more significant than others in predicting the expected response of a visitor viewing a specific web page. In one example embodiment, each variable is assigned with a weight, derived from a predictive model, where the weight represents its predictive significance to the effectiveness of the web page.

Through the visitor context components 500 and 600, the optimization process 112 thus determines selection of web pages based on a combination of factors that are essentially external to the web page. Furthermore, it does not select only one best or optimized web page to serve to the visitor. An optimized web page for one visitor context may not be optimized for a different visitor context, such as a different time of day, or navigation through a direct query versus a popup ad. One or more elements of the visitor context are compiled for other visitors in analogous browsing sessions. Thus, optimization is based on data compiled for many visitor paths to the web page. The optimizer process implements continuous full-path optimization through real-time decision making based on visitor context. Unlike traditional MVT techniques that use a single iteration of multiple variables of a website, the optimizer process 112 iteratively analyzes the various elements of visitor context for different web pages to select one or more optimized web pages from a body of possible web pages.

In one example embodiment, the body of different possible web pages is stored in a data store, such as data store 121, coupled directly or indirectly to page server 108, and that stores a number of pre-defined web pages and web pages that may be authored at the time of the page request by the visitor web browser. Each web page in the data store includes a different combination of feature variations to differentiate it from the other web pages in the body of pages. The componentized web page process 118 may include an authoring tool that is used to generate web pages with specific features or combination of features. Different variations of web pages may be generated and stored in data store 121 in addition to any pre-stored web pages. Alternatively, the authoring tool may be provided as a component within the optimizer process 112 to allow the optimizer server to modify the web pages directly. The authoring tool supports the granular testable components of a web page, such as individual features of the web page and applies business rules defined by the optimizer process.

As shown in FIG. 1, the optimizer process 112 includes a testing component 124 that tests web pages within a body of selectable web pages against one another to select the optimized web page for a given visitor context, based on the features of the web page. In one example embodiment, the test process utilizes random sampling methods in combination with a champion-challenger scheme. For a given visitor context the champion represents the web page currently predicted to be the optimized page. The challengers are web pages that currently are or were previously predicted to have a reasonable chance of outperforming the champion. Collectively, the champion and one or more challengers are called the set of earners for the given visitor context. On the basis of the visitor context some fraction of the visitor traffic is directed to the set of earners, with the remaining traffic being devoted to learning. In this context, a learner web page is a web page that is used to learn with more precision the expected value of a specified metric for the web page and related web page for a particular visitor context and related visitor contexts.

As described below, the set of earners for a visitor context need not necessarily be static but may evolve through the promotion of web pages identified through the learning process to be successful pages to the pool of earner pages, and the demotion of web pages deemed unsuccessful from the pool of earner pages.

Figure 7:
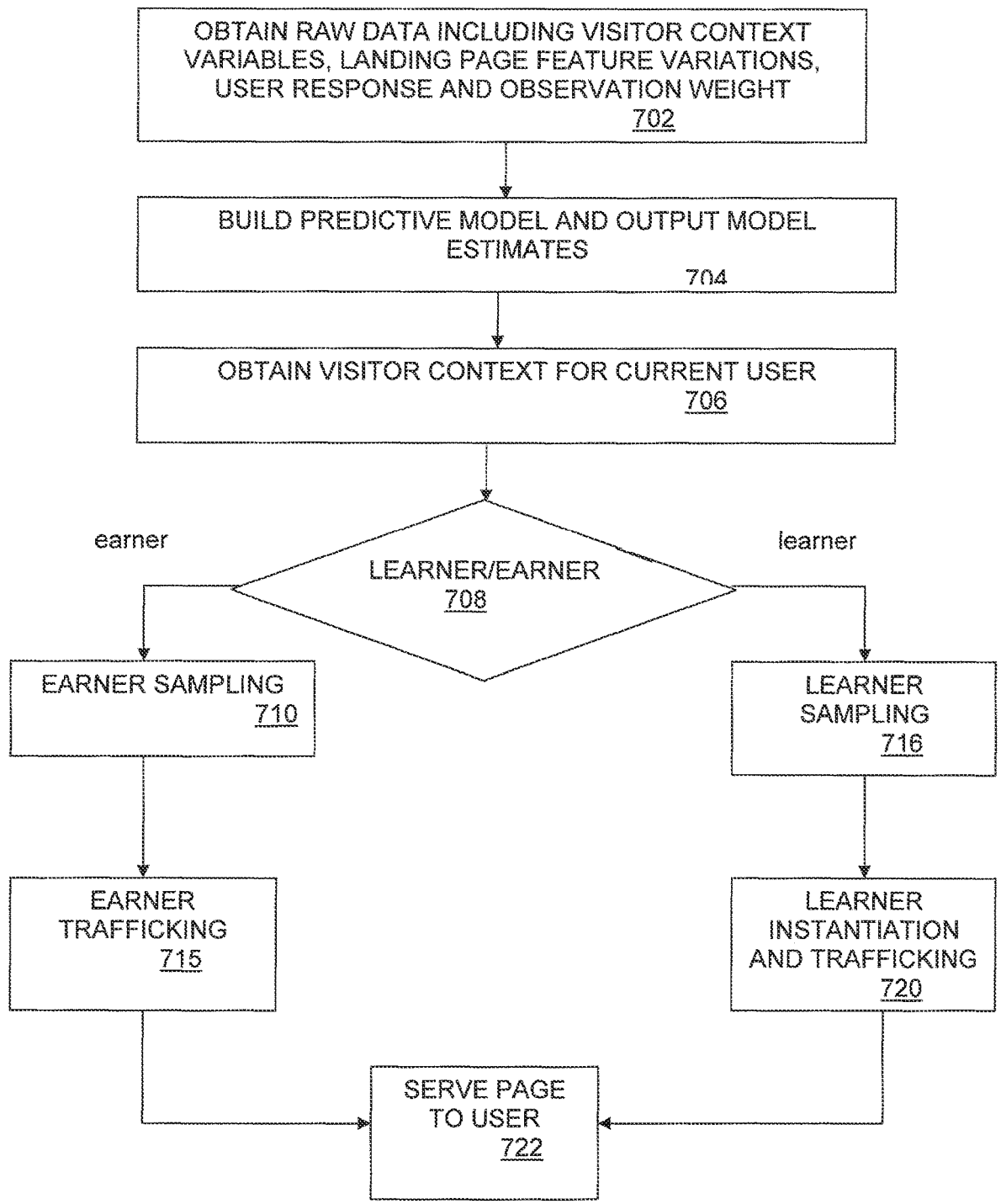
FIG. 7 is a flowchart that illustrates a process flow for real-time optimization through a learning and earning method in an example embodiment.

FIG. 7 is a flowchart that illustrates a process flow for real-time optimization through a learning and earning method in an example embodiment. In block 702, the system obtains raw data to be used as training data in developing a predictive model. Each observation in the training data set describes a visitor context, a web page instance, and the visitor response. In block 704, a predictive model is built, as described previously with reference to FIG. 4. The system outputs the predictive model estimates, which in particular embodiments may be summarized by a set of model parameter coefficients. Typically, blocks 702 and 704 will be executed in an offline mode, for example, on a daily basis. In block 706 the system determines the current visitor context for the current visitor. In block 708 the system uses the current visitor context to determine whether to route the current landing page impression to the earning mode or to the learning mode. In general, the learning mode is used to build up the data that is used to derive the predictive model parameter values, and the earning mode is used to test the effectiveness of deployed web pages and to rotate effective pages in a particular campaign.

In learning mode, the process performs a sampling operation, block 716, to select a web page from the body of web pages to serve to the visitor. In one example embodiment the system samples uniformly from the body of web pages. In another example embodiment, the set of earners for the current visitor context is excluded from the set of web pages from which the sampling is done. In another example embodiment, the top N web pages as determined by predicted expected visitor response for the current visitor context are identified and over-sampled relative to the remaining body of web pages. The value of the parameter N may be pre-specified or may be determined using a rule applied to the predictions of the predictive model, such as including all web pages predicted to perform within 3% (or similar range) of the predicted best web page. Those skilled in the art will recognize this approach as being akin to an e-greedy algorithm as applied to multi-armed bandits, where the best arm is pulled with probability 1-$\varepsilon$, and any other arm is uniformly randomly pulled with probability $\varepsilon$. In another example embodiment, the sampling distribution is based on a predicted upper confidence bound for each web page of the body of web pages. The upper confidence bound is computed as the expected visitor response plus a specified number of standard deviations of the expected visitor response, where the expected visitor response and the standard deviation of the expected visitor response are derived from the predictive model. Those skilled in the art will recognize this approach as being akin to the upper confidence bound approach to multi-armed bandit problems, in which the arm with the highest upper confidence bound is selected to be pulled next. If the predictive model involves a regression-type model, then one example embodiment of the sampling algorithm is a Gibbs sampler. Given the visitor context, selection of a web page involves specifying a variation for each landing page feature. The Gibbs sampler is initialized by uniformly selecting one of the variations for each landing page feature. One step of the Gibbs sampler involves iterating over the landing page features. At each iteration of the sampling process, one of the landing page features is considered. The system samples from the subset of web pages defined by sharing the current variations of all the other landing page features but differing on the variation of the landing page feature currently under consideration. Sampling amongst this subset of web pages is conducted with the probabilities being proportional to the upper confidence bounds for each web page. The Gibbs sampler is terminated after a specified number of steps with the current web page being selected. The selected web page is passed to a learner instantiation and trafficking process, block 720, before being served to the visitor, block 722.

If the process in block 708 routes the current landing page impression to the earning mode, an earner sampling process is executed, block 710. In one example embodiment the number of earners for a given visitor context is limited to be on the order often web pages, (or a similar number), which is typically many fewer than the total number of possible web pages, which could run to thousands or millions of pages. The earner sampling process is then necessarily much simpler than the learner sampling process. In one example embodiment the web page is selected uniformly from the set of earners. In another example embodiment, the a greedy algorithm described above is employed, i.e., the champion web page is selected with probability 1-ε and one of the challengers is uniformly randomly selected with probability another example embodiment the sampling distribution is based on a predicted upper confidence bound for each web page in the set of earners, as described above. In another example embodiment, the web page is selected uniformly from a subset of the earners. For this embodiment, the champion is in the subset. Each challenger is compared pair-wise with the champion using the predicted expected response and the standard deviation of the expected response for the champion and the challenger to define a test statistic. If the test statistic is below a specified threshold, the challenger is included in the subset, otherwise it is excluded. In other example embodiments, the subset of earners is determined as just described but the sampling distribution across the subset is determined by the e-greedy algorithm or by the upper confidence bound algorithm. In another example embodiment the subset of earners is determined as above but the sampling distribution across the subset is determined by the number of consecutive periods for which the web page has been a member of the subset, with those web pages which are more recent additions to the subset being down-sampled relative to the longer-lived subset members, in another example embodiment the determination of the subset of earners is adjusted as follows. Any web page for which the number of consecutive periods for which the web page has been a member of the set of earners is less than some threshold is included in the subset, regardless of the outcome of its comparison with the champion.

Alternatively, any web page for which the number of landing page impressions that it has received since becoming a member of the set of earners is fess than some threshold is included in the subset, regardless of the outcome of its comparison with the champion. In another example embodiment the sampling distribution for the web pages in the subset is dependent on whether the web page is included in the subset based on its recency to or lack of landing page impressions while a member of the set of earners, or based on its comparison with the champion. Web pages that are relatively new to the set of earners share a fixed proportion of earning mode landing page impressions uniformly amongst themselves, with the remaining proportion being distributed amongst the remaining web pages in the subset according to one of the rules outlined above. The selected web page is then passed to an earner trafficking process, block 715, before being served to the visitor, block 722.

Figure 8:
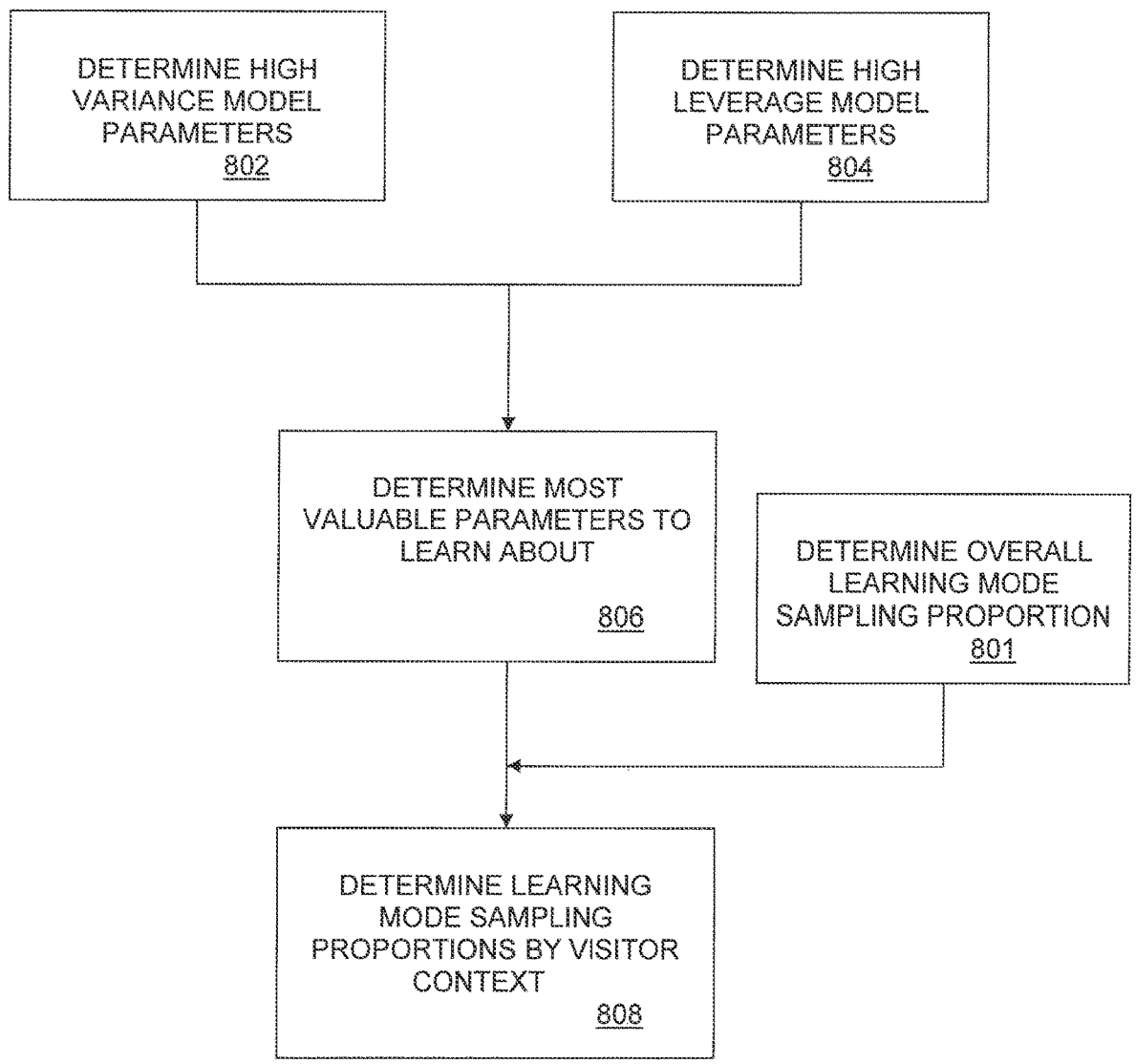
FIG. 8 is a flowchart that illustrates a method of determining the optimization for modeling in learning mode sampling proportion in an example embodiment.

As shown in FIG. 7, given the visitor context of the current visitor, the system decides to route the landing page impression to earning or to learning mode, block 708. In one example embodiment, this decision is determined through a process that identifies visitor contexts or the interaction between visitor contexts and landing page features where learning can be employed most profitably. FIG. 8 is a flowchart that illustrates a method of determining the optimization for modeling in learning mode sampling proportion in an example embodiment. The system first determines the overall learning mode sampling proportion, block 801. This specifies the percentage of all landing page impressions that will be directed to learning mode as opposed to earning mode during the course of the next time period, a time period being typically a day. In one example embodiment this proportion is fixed over the lifetime of the campaign. In another example embodiment, this proportion declines as a function of the number of time periods since the start of the campaign or as the number of time periods remaining in the campaign decreases. In another example embodiment the proportion declines as a function of the number of landing page impressions served in the campaign to date or as the number of landing page impressions estimated to be served during the remainder of the campaign decreases. In another example embodiment this proportion is increased whenever new landing page features or landing page feature variations are added to the campaign or whenever new visitor contexts are defined. In particular embodiments the overall learning mode proportion is applied to all visitor contexts equally, but other embodiments the learning mode proportion specific to a visitor context is adjusted as illustrated in FIG. 8. The adjustment will be upwards for some visitor contexts and downwards for others so that the overall learning mode proportion equals that determined in block 801.

As shown in FIG. 8, the system determines the visitor contexts and (visitor context, landing page feature variations) combinations (or equivalently, corresponding model parameters in the predictive model) for which the variance around the performance predictions derived from the predictive model is high, block 802. Further, the system determines the visitor contexts and (visitor context, landing page feature variations) (or equivalently, corresponding model parameters in the predictive model) that are high leverage, block 804. High leverage means that reducing the uncertainty in the performance predictions of the predictive model will allow the model to effectively distinguish the performance of two or more landing page feature variations for one or more visitor contexts, thereby allowing the system to direct more traffic to one of the two or more landing page feature variations and leading to better overall campaign response. So, for example, consider a visitor context and a landing page feature with variations A and B. If variation A is predicted to perform substantially better than variation B, then the visitor context-landing page feature variation B combination is not high leverage. Equally, if no other variation of the landing page feature is predicted to perform better or comparably to variation A, then the visitor context-landing page feature variation A combination is not high leverage. It is only if variations A and B are predicted to have comparable performance and no other variation of the landing page feature is predicted to perform substantially better than variations A and B, that the visitor context-landing page feature variation A and the visitor context-landing page feature variation B combinations are considered to be high leverage. The system uses the determinations of high variance and high leverage visitor contexts and visitor context-landing page feature variations combinations to determine the most valuable visitor contexts (equivalently, most valuable predictive model parameters) about which to learn, block 806. This parameter selection is then used to determine how to adjust the learning mode sampling proportion for each visitor context, block 808.

Figure 9:
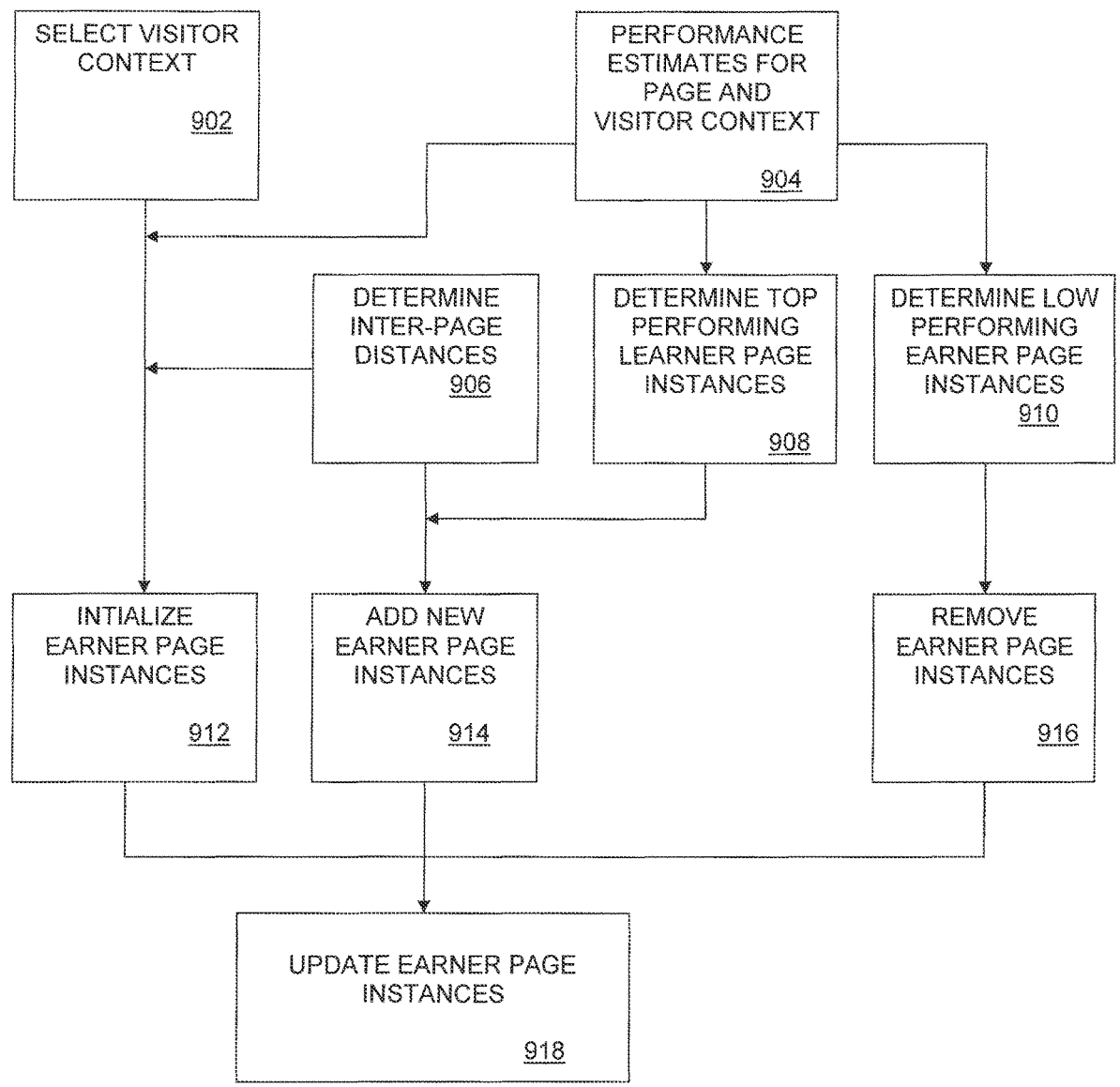
FIG. 9 is a flowchart that illustrates a method for evolving a set of earners across time periods to optimize campaign performance in an example embodiment.

FIG. 9 is a flowchart that illustrates a method for evolving the set of earners across time periods to optimize campaign performance in an example embodiment. In block 902, a visitor context is selected. For the selected visitor context the set of earner page instances is initialized, block 912. In one example embodiment the set of earners is selected randomly from the body of web pages. In another example embodiment an initialization step is conducted, during which the web page to serve for all landing page impressions is randomly selected from the body of web pages. In this embodiment the process requires data related to performance estimates for particular web pages and visitor contexts, block 904, as derived from the predictive model. At the conclusion of the initialization step the predictive model is utilized to predict web page performance, and the set of earner web pages is selected from among the web pages predicted to be top performing. In another example embodiment the process also determines inter-page distance, block 906. The body of web pages can be thought of as existing in a multi-dimensional hyperspace as defined by the landing page features and variations. Each web page instance represents a point in the hyperspace. By defining a distance metric on the hyperspace, the distance between any pair of pages can be computed. In this embodiment the selection of the set of earners is subject to a constraint on the distance between any pair of page instances included in the set. Alternatively, the set of earners is chosen so as to optimize an objective function such as A-, D-, E-, G- or I-efficiency from the field of design of experiments, which will be familiar to those skilled in the art.

Once the set of earners has been initialized, at every future time period the performance predictions derived from the predictive model, block 904, determine the top performing learner page instances, block 908, and the low-performing earner page instances, block 910. The top performing learner page instances that are sufficiently distant from the current set of earner pages are added to the earner pool, block 914. The low-performing earner page instances identify earner pages that are to be removed from the pool of earner pages, block 916. In one example embodiment the top-performing learner pages are compared with the low-performing earner pages to determine which learner pages should replace which earner pages in the earner pool. The added, removed and initialized earner page instances all help determine the updated set of earner page instances, block 918.

The integrated optimization and testing scheme illustrated in FIGS. 7, 8, and 9 represents a core component of the continuous full-path optimization process in which web pages are continuously tested against one another in a "learn and earn" methodology. The testing block 716 allows the system to learn the respective effectiveness of the body of possible web pages through structured test routines. The use of different visitor contexts allows for differentiation of visitor traffic and web page features, and the creation or selection of web pages based on these visitor contexts. Selected landing pages are pushed to the visitor to determine their actual effectiveness during deployment.

The optimization process described herein utilizes an extensive amount of data relating to multiple visitors' experiences during browsing sessions to determine the optimized construction of a web page having multiple features. A full-path optimization process uses variables related to visitor characteristics, traffic data, and web page features to continuously test variations of web pages against each other to determine the most effective web page for a given visitor context.

Particular embodiments of the web page optimization method described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing particular embodiments include: microcontrollers with memory (such as EEPROM), embedded microprocessors, firmware, software, etc. Furthermore, particular embodiments of the content serving method may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, or as data or instructions embodied in various machine-readable or computer-readable media, in terms of their behavioral, register transfer, logic component, or other characteristics. Computer-readable media in which such formatted data or instructions may be embodied include, but are not limited to, non-volatile storage media in various forms (e.g., optical, magnetic or semiconductor storage media) and carrier waves that may be used to transfer such formatted data or instructions through wireless, optical, or wired signaling media or any combination thereof. Examples of transfers of such formatted data or instructions by carrier waves include, but are not limited to, transfers (uploads, downloads, e-mail, etc.) over the Internet or other computer networks via one or more data transfer protocols (e.g., HTTP, FTP, SMTP, and so on).

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
receiving, by one or more computer systems, a request for a landing page to be presented to a current visitor, the landing page having one or more landing-page components each of which results from combining different feature variations;
predicting, by the one or more computer systems, a plurality of responses of a current visitor to possible instances of the landing page based on a current visitor context and possible feature variations of the possible instances of the landing page,
selecting, by the one or more computer systems, one of the possible: instances of the landing page based on the predicted responses;
constructing, by the one or more computer systems, an instance of the landing page based on the selected one of the possible instances of the landing page; and
transmitting, by the one or more computer systems, the constructed instance of the landing page to the current visitor.

2. The method of claim 1, wherein the current visitor context comprises one or more of a group of current visitor contexts comprising: demographic data of the current visitor;
conditions of a current web-browsing session;
network-access data of the current web-browsing session; and
network-traffic data of the current web-browsing session.

3. The method of claim 2:
further comprising accessing one or more previous-visitor contexts of one or more previous visitors to the constructed landing page in previous web-browsing sessions; and
wherein:
the one of the possible instances of the landing page is selected based on the previous-visitor contexts in addition to the current visitor context; and
the one of the possible instances of the landing page is substantially most likely to generate a highest expected outcome from interaction with the landing page by the current visitor as indicated by the previous visitor context as well as the current visitor context.

4. The method of claim 3, wherein previous web-browsing sessions are analogous to current web-browsing sessions.

5. The method of claim 4, wherein the previous visitor contexts comprise one or more of a group of previous visitor contexts comprising:
demographic data of the previous visitor;
background data of the previous visitor;
conditions of the previous web-browsing sessions;
network-access data of the previous web-browsing sessions; and
network-traffic data of the previous web-browsing sessions.

6. The method of claim 4, wherein the previous visitor contexts comprise one or more of a group of previous visitor contexts comprising:
an action taken by the previous visitor;
a response of the previous visitor to the landing page; and
a traffic source from which the previous visitor accessed the landing page.

7. The method of claim 2, wherein:
the constructed landing page has one or more web-page components that each have one or more possible feature variations; and
the plurality of possible instances of the landing page result from different combinations of at least some of the possible feature variations of the web-page components.

8. The method of claim 7, wherein the features are selected from a group comprising a background color, an audio element, a video element, a text element, a size, a dimension, and a web-page layout.

9. The method of claim 2, wherein the constructed landing page comprises one or more advertisements.

10. The method of claim 9, wherein one or more of the advertisements include banner advertisements.

11. The method of claim 10, wherein one or more of the advertisements include text-based content.

12. The method of claim 1, wherein the current visitor context comprises one or more of a group of current visitor contexts comprising:
an action taken by the current visitor;
a response of the current visitor to the constructed landing page; and
a traffic source from which the current visitor is accessing the constructed landing page.

13. The method of claim 1, further comprising receiving a response from the current visitor to the constructed instance of the landing page; and
updating a performance estimate of a feature variation based on the response from the current visitor.

14. A system comprising:
one or more processors and a memory storing executable instructions that, when executed by the one or more processors, cause the one or more processors to perform operations comprising:
receiving, by one or more computer systems, a request for a landing page to be presented to a current visitor, the landing page having one or more landing-page components each of which results from combining different feature variations;
predicting, by the one or more computer systems, a plurality of responses of a current visitor to possible instances of the landing page based on a current visitor context and possible feature variations of the possible instances of the landing page,
selecting, by the one or more computer systems, one of the possible instances of the landing page based on the predicted responses;
constructing, by the one or more computer systems, an instance of the landing page based on the selected one of the possible instances of the landing page; and
transmitting, by the one or more computer systems, the constructed instance of the landing page to the current visitor.

15. The system of claim 14, wherein the one or more processors are further configured to receive a response from the current visitor to the constructed instance of the landing page; and update a performance estimate of a feature variation based on the response from the current visitor.

16. The system of claim 14, wherein the current visitor context comprises one or more of a group of current visitor contexts comprising:
   demographic data of the current visitor;
   conditions of a current web-browsing session;
   network-access data of the current web-browsing session; and
   network-traffic data of the current web-browsing session.

17. The system of claim 14, wherein the current visitor context comprises one or more of a group of current visitor contexts comprising:
   an action taken by the current visitor;
   a response of the current visitor to the constructed landing page; and
   a traffic source from which the current visitor is accessing the constructed landing page.

18. The system of claim 14:
   wherein the one or more processors are further configured to access one or more previous-visitor contexts of one or more previous visitors to the constructed landing page in previous web-browsing sessions; and
   wherein:
   the one of the possible instances of the landing page is selected based on the previous-visitor contexts in addition to the current visitor context; and
   the one of the possible instances of the landing page is substantially most likely to generate a highest expected outcome from interaction with the landing page by the current visitor as indicated by the previous visitor context as well as the current visitor context.

19. A non-transitory machine-readable medium including instructions which, when read by a machine, cause the machine to perform operations comprising, at least:
   receiving, by one or more computer systems, a request for a landing page to be presented to a current visitor, the landing page having one or more landing-page components each of which results from combining different feature variations;
   predicting, by the one or more computer systems, a plurality of responses of a current visitor to possible instances of the landing page based on a current visitor context and possible feature variations of the possible instances of the landing page,
   selecting, by the one or more computer systems, one of the possible instances of the landing page based on the predicted responses;
   constructing, by the one or more computer systems, an instance of the landing page based on the selected one of the possible instances of the landing page; and
   transmitting, by the one or more computer systems, the constructed instance of the landing page to the current visitor.

20. The non-transitory machine-readable medium of claim 19, wherein the operations further comprise receiving a response from the current visitor to the constructed instance of the landing page; and
   updating a performance estimate of a feature variation based on the response from the current visitor.

* * * * *